US005095880A

United States Patent [19]
Ricks

[11] Patent Number: 5,095,880
[45] Date of Patent: Mar. 17, 1992

[54] AIR PURGING AND SHUT-DOWN SYSTEM FOR DIESEL ENGINES

[76] Inventor: Robert C. Ricks, 22098 Call of the Wild, Los Gatos, Calif. 95030

[21] Appl. No.: 748,692

[22] Filed: Aug. 22, 1991

[51] Int. Cl.[5] ........................ F02M 39/00; F02K 31/1
[52] U.S. Cl. .................................. 123/516; 123/510; 123/198 DB
[58] Field of Search ............... 123/510, 512, 514, 516, 123/198 D, 198 DB

[56] References Cited

U.S. PATENT DOCUMENTS

| | | | |
|---|---|---|---|
| 2,252,687 | 8/1941 | Basset | 183/2.5 |
| 2,313,773 | 3/1941 | Samiran | 137/69 |
| 2,323,525 | 7/1943 | Ebel et al. | 183/2.5 |
| 2,334,220 | 7/1943 | Samiran | 158/36 |
| 2,367,692 | 1/1945 | Samiran | 154/46.5 |
| 2,447,008 | 8/1948 | Gouy | 158/36.3 |
| 2,811,219 | 10/1957 | Wenzl | 183/2.5 |
| 2,847,149 | 8/1958 | Ainsworth | 222/544 |
| 2,878,889 | 3/1959 | Gilbert | 183/2.5 |
| 2,998,057 | 8/1961 | Graham | 158/36.3 |
| 3,408,152 | 10/1968 | Cole | 431/89 |
| 4,013,053 | 3/1977 | Dinkelkamp et al. | 123/136 |
| 4,066,386 | 1/1978 | Johnson et al. | 417/199 |
| 4,253,802 | 3/1981 | Glikin | 417/199 |
| 4,543,938 | 10/1985 | Szlaga | 123/514 |
| 4,602,605 | 7/1986 | Adkins | 123/198 D |
| 4,617,116 | 10/1986 | Seiler | 123/514 |
| 4,715,345 | 12/1987 | Reames, Jr. | 123/512 |
| 4,730,591 | 3/1988 | Gohara et al. | 123/510 |
| 4,763,621 | 8/1988 | Stevens | 123/198 D |
| 4,763,684 | 8/1988 | Kelch | 123/516 |
| 4,776,315 | 10/1988 | Greiner | 123/198 D |
| 4,809,666 | 3/1989 | Baltz | 123/510 |
| 4,874,013 | 10/1989 | Hack, Jr. | 123/510 |
| 4,878,816 | 11/1989 | Tuckey | 123/510 |
| 4,960,088 | 10/1990 | Havemann et al. | 123/198 D |

FOREIGN PATENT DOCUMENTS

| | | | |
|---|---|---|---|
| 905703 | 5/1961 | United Kingdom | 123/510 |

*Primary Examiner*—E. Rollins Cross
*Assistant Examiner*—Thomas N. Moulis
*Attorney, Agent, or Firm*—Phillips, Moore, Lempio & Finley

[57] ABSTRACT

A fuel system for a diesel engine includes an air purging system for venting trapped air to a vent line connected to a fuel tank and an emergency shut-down system for providing a fail-safe shut-down of the engine when fuel is low. The air-purging system comprises a device defining a float chamber having an air outlet communicating with the vent line, a fuel inlet, and a fuel outlet. A float is disposed in the chamber and is adapted to move between a normal first position closing the air outlet, an emergency intermediate second position opening both the air and fuel outlets, and a shut-down third position opening the air outlet and closing the fuel outlet. The emergency shut-down system includes electronic and pressure sensitive switches, warning lights, and an auxiliary fuel pump to monitor and control the shut-down and restart modes of engine operation. The air purging system is adapted to function independently of the emergency shut-down system.

19 Claims, 2 Drawing Sheets

AIR PURGING AND SHUT-DOWN SYSTEM FOR DIESEL ENGINES

TECHNICAL FIELD

This invention relates generally to a fuel system for a diesel engine and more particularly to a control system for purging air from an engine's fuel line and for facilitating engine shut-down and start-up.

BACKGROUND OF THE INVENTION

The standard fuel system for a diesel engine includes, in connected series, a tank adapted to contain liquid diesel fuel therein, a transfer pump, injection pumps and a plurality of injectors for injecting diesel fuel into the combustion chambers of the engine. When the fuel in the tank of a vehicle is low and the vehicle stops abruptly, starts or sharply changes its attitude, air will tend to enter the fuel line to the injection pumps to induce engine stalling. It is common practice to install a sock-like steel mesh strainer at the outlet from the fuel tank to aid in counteracting the air vortexing and cavitation effect that induces engine stalling.

However, use of this type of strainer is not totally efficient and will not prevent air from entering the fuel line when the fuel tank becomes empty and also when the engine is restarted after refilling of the tank. In either situation, stalling of the engine normally requires towing of the vehicle to a service facility for the purpose of removing air from the fuel lines to enable the engine to be restarted. Further, strainers of this type periodically become clogged and require removal of the fuel tank for cleaning and replacement purposes. This procedure is unduly expensive and involves substantial "downtime."

Various devices have been proposed for the purpose of preventing the communication of air through the fuel line and to the fuel pumps of an engine when the fuel in the tank drops below a predetermined low level. For example, U.S. Pat. No. 4,602,605 discloses an automatic shut-off device for the fuel system for a diesel engine wherein a float switch is actuated to shut an engine down in response to the fuel dropping below such a low level in the fuel tank. The device has a bleed orifice that allows trapped air to escape and return to the fuel tank when the tank is refilled with fuel. Various other systems have been used in fuel systems of this type to purge air therefrom.

Conventional systems of this type are generally complex in construction and do not insure the reliability required. For example, adequate fuel is not provided, after the driver has been alerted that a "low fuel" or clogged fuel filter condition of engine operation exists, to permit the driver to safely drive off a roadway. Further, no provision is made for restarting the engine expeditiously.

SUMMARY OF THE INVENTION

An object of this invention is to provide an improved and economical air purging and emergency shut-down control system for the fuel system of a diesel engine that is non-complex, highly dependable and efficient in operation, provides adequate fuel for safety purposes before engine stalling, and insures expeditious restarting of the engine, without bleeding of the fuel lines, after an empty fuel tank is re-filled.

In one aspect of this invention, the air-purging portion of the control system comprises an air-purging device defining a float chamber having an air outlet communicating with a vent line connected to a fuel tank, a fuel inlet for receiving fuel from a transfer pump, and a fuel outlet for communicating fuel to an injection pump for a fuel injector. A float, having a specific gravity less than that of the fuel, is freely suspended in unattached relationship in the float chamber for movement between a first position closing the air outlet and a second position closing the fuel outlet when the float chamber is at least substantially empty of fuel. In the preferred embodiment of this invention, an orifice is provided to continuously communicate the float chamber with the injection pump when the fuel outlet is closed.

The air-purging device will insures that no air is trapped in the fuel line connecting the device with the injection pump during normal engine operation and also after the empty fuel tank has been refilled. Further, the device eliminates the need for the above-discussed-type of strainer, normally attached to the outlet from a conventional fuel tank.

In another aspect of this invention, an emergency shut-down system comprises means for insuring adequate fuel for limited engine operation and for further insuring expeditious restart of the engine.

Although the invention described herein finds particular application to diesel engines, it should be understood that it can be adapted for use with other types of internal combustion engines, such as gasoline and methanol engines.

BRIEF DESCRIPTION OF THE DRAWING

Other objects and advantages of this invention will become apparent from the following description and accompanying drawing wherein.

DESCRIPTION OF THE PREFERRED EMBODIMENT

Figure 1:
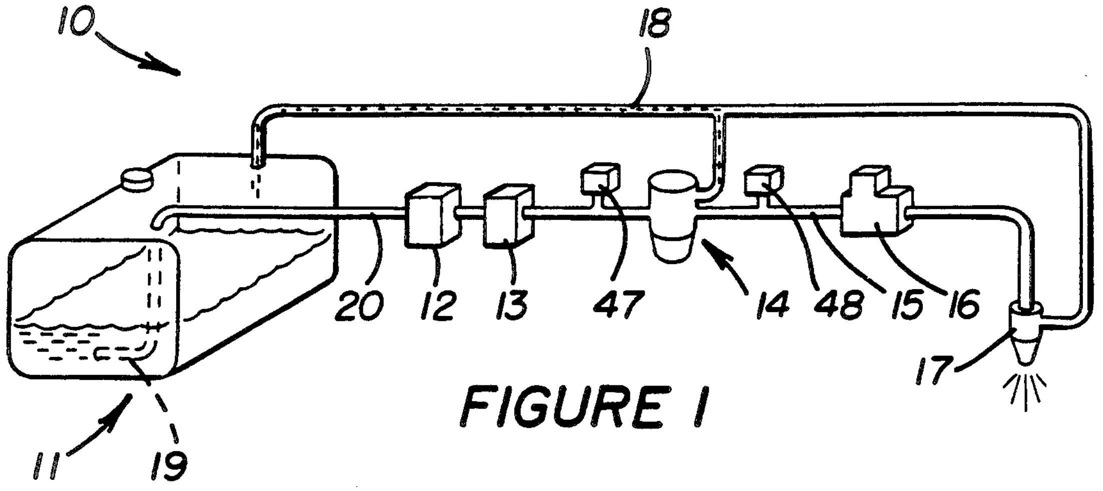
FIG. 1 schematically illustrates a fuel system for a diesel engine, including an air purging system therefor.

FIG. 1 illustrates a fuel system 10 for a diesel engine comprising, in connected series, a fuel tank 11, an engine-driven transfer or main fuel pump 12, an electrically driven auxiliary fuel pump 13, an air purging or anti-air-lock device 14, a branch fuel or suction line 15, fuel distributing means in the form of a solenoid-actuated injection pump 16 and an injector 17 for each cylinder of the engine. Excepting air purging device 14 and auxiliary fuel pump 13, the remaining basic components of the fuel system are conventional and function in a well-known manner. For example, suitable filters (not shown) may be provided for engine-driven fuel pump 12 and injection pump 16 in a conventional manner.

Air purging device 14 functions to prevent air from being communicated to injection pump 16 during normal engine operation and also when the fuel in fuel tank 11 is at least substantially depleted. Air purging device 14 is connected to a vent line 18 which, in turn, is connected to fuel tank 11 to provide an air-purging system for air venting purposes. The vent line is preferably also connected to injector 17 to return excess fuel to the tank.

Conventional fuel systems of this type normally include a standard sock-like steel mesh strainer 19 connected to the inlet to a main fuel line 20, terminating in the fuel tank. The strainer is intended to counteract air vortex effects normally occasioned in the fuel tank, as will be appreciated by those skilled in the diesel engine art. Air purging device 14 eliminates the need for such a strainer, which has given rise to the problems enumerated above.

Figure 3:
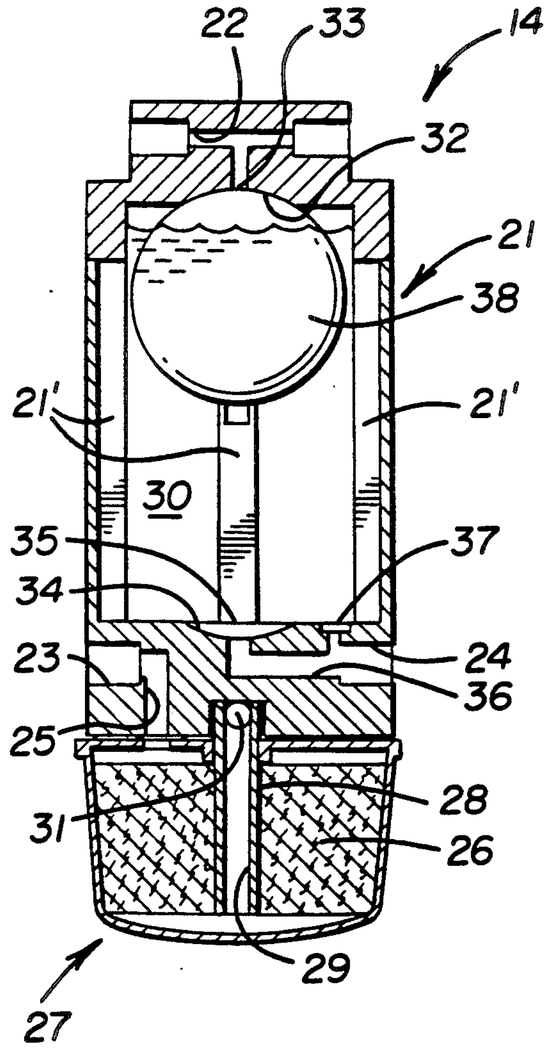
FIG. 3 is a cross-sectional view through the air-purging device, taken in the direction of arrows III—III in FIG. 2.
Figure 2:
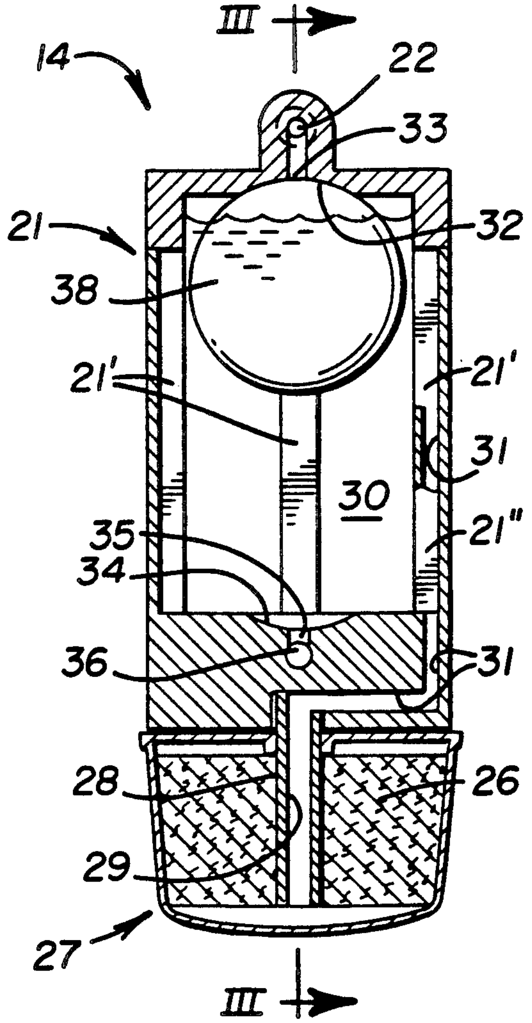
FIG. 2 is a cross-sectional view through an air-purging device of the system.

Referring to FIGS. 2 and 3, air purging device 14 comprises a multi-part housing 21 disposed on a central vertical axis thereof. A vent passage 22 is defined in the housing and is adapted for connection to vent line 18 by a standard fitting. The housing further defines a fuel inlet 23 adapted for connection to fuel line 20 (FIG. 1) and a fuel outlet 24 adapted for connection to suction line 15.

Fuel entering housing 21 from fuel inlet 23 passes through an inlet passage 25 and through a filter 26 of a standard (e.g., Fram Part No. P-3726) separator and filter assembly 27, detachably mounted on the lower end of the housing. The assembly further includes a siphon tube 28 defining an internal passage 29 for communicating the filtered fuel to a float chamber 30 via a passage 31 defined in housing 21 (FIG. 2). A semi-spherically shaped upper seat 32 has an air outlet 33 from float chamber 30 defined centrally therein that communicates with vent passage 22 and vent line 18 (FIG. 1).

A semi-spherically shaped lower seat 34 has a fuel outlet 35 from the float chamber defined centrally therein. Outlet 35 communicates with fuel outlet 24, connectable to suction line 15, via a passage 36 (FIG. 3). A restricted passage or orifice 37 continuously communicates float chamber 30 with passage 36 for purposes described hereinafter. Orifice 37 may be formed through a standard bleed disc, e.g., ⅜″×150 ″ sintered bronze bleed disc manufactured by Pacific Sintered Metal, Inc. under Part No. F-100.

A spherically-shaped ball float 38, having a specific gravity less than that of the fuel, is freely suspended in unattached relationship within float chamber 30. The ball float is adapted to move between: (1) A normal first position (FIGS. 2–4) engaging upper seat 33 when the float chamber is at least substantially full of fuel to close air outlet 33 and open outlet 35; (2) An emergency intermediate second position opening both outlets 33 and 35; and (3) A shut-down third position engaging lower seat 34 to close outlet 35 when fuel tank 11 and the float chamber are at least substantially empty of fuel. Upper and lower seats 32,34 and outlets 33,35 are aligned vertically and the diameters defining the seats and ball float 38 are identical.

Ball float 38 is in the form of a sphere having a diameter preferably selected from the approximate range from 1.5 in. to 3.5 in. The specific gravity of the ball float is preferably selected from the approximate range from 0.50 to 0.95. The ball float may be entirely composed of a suitable natural or synthetic elastomeric material, such as a suitably composed Buna "N" material or its equivalent, preferably having a durometer hardness selected from the approximate range of from 20 to 60.

The spherical shape and elasticity of the ball float will insure a positive static seal on outlet 33 when the ball float is in its FIG. 2 solid line position due to the closing force imposed thereon by the pressurized fuel in chamber 30. As described hereinafter, the ball also insures a positive static seal on outlet 35 when chamber is emptied due to the differential pressure occasioned thereacross. The identical spherical shapes of the ball float and seats 32,34 will insure such static seals for all rotative positions of the ball float in float chamber 30. The inside diameters of a plurality of guide ribs 21′ formed internally on housing 21 and extending radially into float chamber 30, are only slightly larger than the diameter of the ball float. The vertically and circumferentially disposed ribs will precisely guide vertical movements of the ball float, essentially on the central vertical axis of device 14, to insure the above-discussed static sealing desiderata.

A lower portion 21′ of one of the ribs has the termination of passage 31 formed therein with the face plate of the upper portion of the rib being slotted or removed to expose the passage to chamber 30. Alternatively, a separate and shortened fifth rib (not shown) could be formed internally on housing 21 to define the termination of passage 31 therein. Such a rib would terminate short of the upper wall of the housing and would have the outlet from passage 31 defined thereat.

Bleed passage o orifice 37 functions to communicate a predetermined low volume of fuel flow from float chamber 30 to fuel outlet 24 when ball float 38 is in its closed position on lower outlet 35. Although normally insufficient to support idling of the diesel engine, the volume of fuel communicated to the fuel outlet (when available) is sufficient to free the ball float from lower seat 34 by normalizing the suction effect imparted to the ball float by operation of injection pump 16 when the fuel tank is at least partially filled, after it has emptied. The bleed orifice is preferably sized to have a constant cross-sectional area selected from the approximate range from 0.004 in.$^2$ to 0.015 in.$^2$.

In normal operation and with fuel tank 11 having adequate fuel to maintain engine operation, float chamber 30 (FIGS. 2 and 3) will be sufficiently full of fuel to permit ball float 38 to rise to its nested position on upper seat 32 to close outlet 33. During an inclined mode of operation of the vehicle, for example, the lower open end of syphon tube 28 will remain immersed in fuel to insure continued engine operation. Air trapped in float chamber 30 will be vented to fuel tank 11 when float periodically unmasks outlet 33 during normal conditions of engine and vehicle operation.

Figure 4:
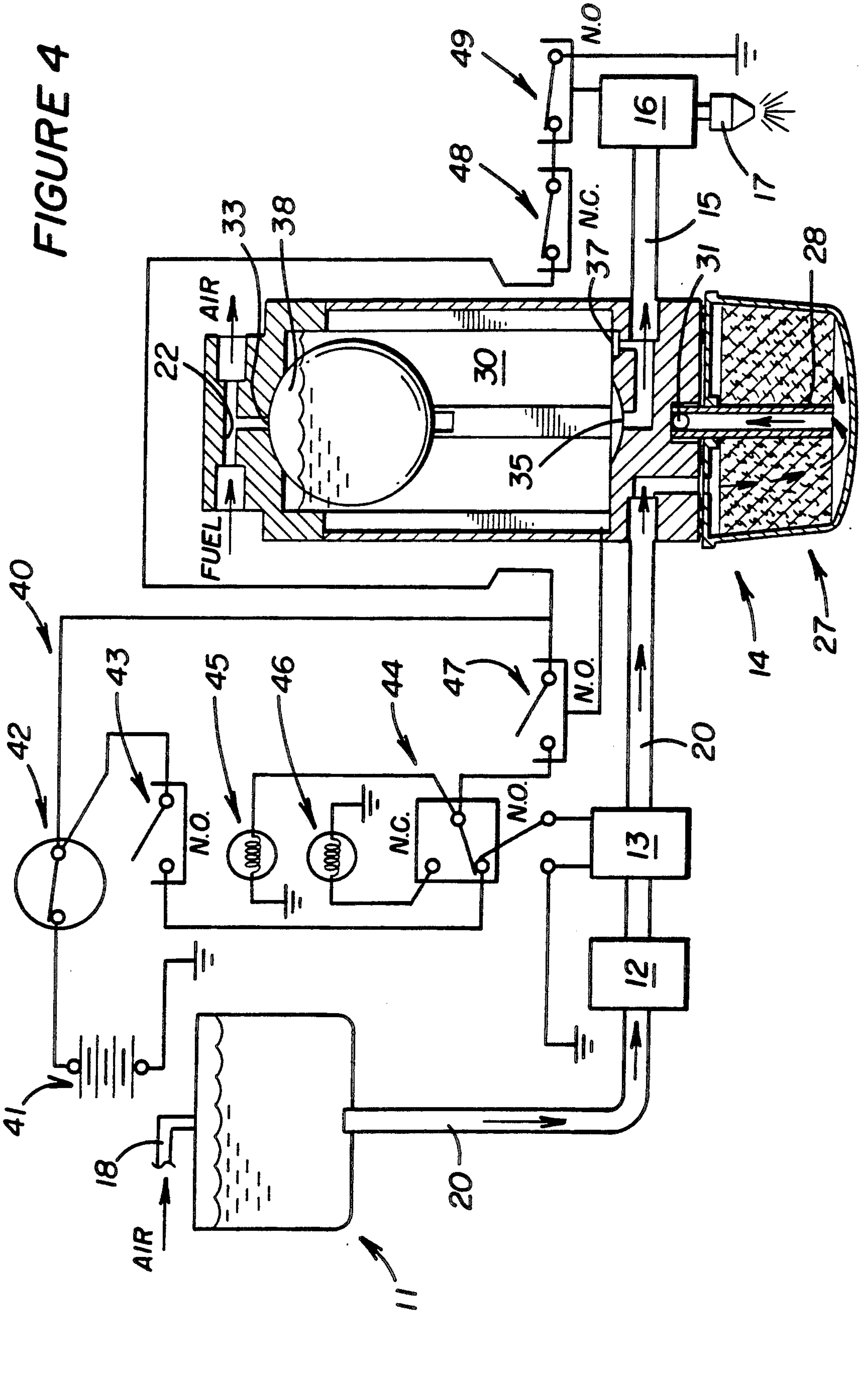
FIG. 4 schematically illustrates an emergency shut-down system integrated into the fuel system.

FIG. 4 schematically illustrates an emergency shut-down (and restart) system 40 that includes monitor and control means that functions to automatically alert a driver that the fuel supply is nearing empty (e.g., one gallon) to provide sufficient time (e.g., five minutes) for a vehicle to be driven to safety. After a safe and controlled shut-down of the engine, the system further enables the engine to be restarted when fuel tank 1 is again at least partially filled. The emergency shut-down system remains inactive during normal engine operation and does not interfere with the normal operation of the above-described air purging system.

In the embodiment illustrated in FIG. 4, integrated emergency shut-off system 40 includes the vehicle's battery 41 and a standard ignition switch 42 that must be closed in a conventional manner for the normal mode of engine operation illustrated. The ignition switch is connected in series to a cab-mounted and normally-open (spring biased) restart switch 43 and a two-position pressure responsive pump control switch 44, connected to normally-off electrically-driven fuel auxiliary pump 13 for purposes explained hereinafter.

Switch 44 may be normally spring-biased to its illustrated first position in closed connection with a normally-off cab-mounted fuel pressure indicator light (or gage) 45. Switch 44 is adapted to be tripped to a second position for closed connection to a normally-off cab-mounted emergency indicator light (or gage) 46, as described hereinafter. In the illustrated first position of switch 44, auxiliary fuel pump will be activated in response to a closing of a switch 47.

Normally-open pressure responsive switch 47 is continuously connected to chamber 30 to sense fuel pressure therein and is adapted for closed electrical connection to either pump 13 or indicator light 46, as dictated by the position of switch 44. Ignition switch 42 is further connected in series to a normally closed pressure responsive vacuum switch 48, connected to fuel suction line 15 on the upstream side of injector pump 16 to sense the fuel pressure therein. Switch 48 is connected to a standard normally closed solenoid switch 49, controlling activation of the injection pump.

The above-referenced individual components comprising emergency shut-down system 40 are off-the-shelf items that can be purchased commercially. For example, electrically-driven auxiliary fuel pump 13 can constitute a Carter Model No. P4070. Switches 44, 47 and 48 can be of the types manufactured by Stewart-Warner, Inc. and are identified as part Nos. 76078 (25-50 psi), 76585 (4.0 psi) and 4077 (2 in. V.S.M.), respectively.

The operation of the above-described air-purging and emergency shut-down systems will now be explained through the "NORMAL RUNNING," "WARNING," "SHUT-DOWN," and "RESTART" modes of engine operation.

NORMAL RUNNING MODE

FIG. 4 illustrates the air-purging and emergency shut-off systems in their respective normal conditions when the engine is being supplied with sufficient fuel to run normally. Ball float 38 will normally close-off outlet 33 to vent line 18 when no adverse air pockets or bubbles exist in float chamber 30 (FIGS. 2-4) and downstream thereof to injector 17 (FIG. 1). However, should air cavitation or the like occur in the system, the ball float will unseat to vent the trapped air back to fuel tank 11, via passage 22 and vent line 18. Emergency shut-down system 40 remains inactive and will not interfere with the normal operation of the air purging system.

WARNING MODE

In the event that fuel runs low as a result of normal engine operation or otherwise (e.g., clogged filter 26 or main fuel line break), the driver will be afforded sufficient fuel (e.g., one gallon) and time (e.g., five minutes) to drive his vehicle to safety. Referring to FIG. 4, switch 47 will close automatically in response to a drop in fuel pressure in chamber 30 (e.g., below 4.0 psia) to illuminate warning light 45 and to activate electrically driven auxiliary fuel pump 13 to augment the pumping force of pump 12. Unless filter 26 is clogged, pumps 12 and 13 will pump the remaining fuel in tank 11 and line 20 to float chamber 30 of air-purging device 14 to insure continued, but temporary, running of the engine. It should be noted that switch 47 could be connected only to fuel line 20, but would not then provide the "clogged filter" alerting function.

During this temporary mode of engine operation, ball float 38 will drop in chamber 30. Thus, outlet 33 will remain open to continuously vent air to the fuel tank via passage 22 and vent line 18. The relatively reduced pressure in suction line 15, occasioned by the running of injection pump 16, will induce the remaining fuel in float chamber 30 to be communicated to injector 17.

During this mode of operation, float chamber 30 functions as a reservoir for the temporary volume of fuel required to drive the vehicle to safety. In this sense, and due to connection of switch 47 to chamber 30, air-purging device 14 can be considered a part of emergency shut-down system 40.

SHUT-DOWN MODE

The system is activated to its SHUT-DOWN condition of engine operation in response to the absence of fuel pressure in main fuel line 20 and a negative pressure in suction line 15. Automatically, switch 44 is tripped to its second position in response to an absence of fuel pressure in pump 13 to illuminate warning light 46 and switches 48 and 49 open in response to the absence of fuel pressure in line 15 to deactivate injection pump 16. Ball float closes on outlet 35 of air-purging device 14, but chamber 30 remains in communication with passage 36 and suction line 15 via orifice 37 for the following restart mode. The driver is thus able to drive his vehicle to a safe stop and inspect the system for an empty fuel tank condition, broken main fuel line, or other malfunction.

RESTART MODE

Assuming lack of fuel has been the problem, fuel tank 11 is at least partially filled to supply fuel pressure to line 20. The driver will then temporarily close normally open spring-biased switch 43 to activate auxiliary fuel pump 13 to communicate fuel to chamber 30 of air-purging device 14. The fuel further communicates to suction line 15 to close switches 48 and 49 automatically whereby the air-purging and emergency shut-down systems return to their normal conditions shown in FIG. 1 to commence normal engine operation.

Continuous communication of fuel from float chamber 30 to suction line 15, via orifice 37, will insure that ball float 38 will release from seat 34 to uncover outlet 35. Otherwise stated, in the absence of orifice 37 the differential pressure across the all float would tend to hold the ball float on outlet 35, i.e., the initial operation of fuel pump 16 would tend to draw a negative pressure in suction line 15 with outlet being exposed to ambient pressure via vent line 18.

The following chart summarizes the above-described modes of operation, beginning with the normal mode of operation shown in FIG. 4:

| | MODE OF OPERATION | | | |
|---|---|---|---|---|
| SYSTEM COMPONENT | NORMAL | WARNING | SHUT-DOWN | RESTART |
| TANK 11 | FULL | LOW | EMPTY | FULL |
| PUMP 12 | ON | ON | OFF | ON |
| PUMP 13 | OFF | ON | OFF | ON |
| PUMP 16 | ON | ON | OFF | ON |
| CHAMBER 30 | FULL | PARTIAL | EMPTY | PARTIAL |
| OUTLET 33 | CLOSED | OPEN | OPEN | OPEN |
| OUTLET 35 | OPEN | OPEN | CLOSED | OPEN |

-continued

| SYSTEM COMPONENT | MODE OF OPERATION | | | |
|---|---|---|---|---|
| | NORMAL | WARNING | SHUT-DOWN | RESTART |
| ORIFICE 37 | OPEN | OPEN | OPEN | OPEN |
| FLOAT 38 | UP | INTER. | DOWN | INTER. |
| SWITCH 42 | CLOSED | CLOSED | CLOSED | CLOSED |
| SWITCH 43 | OPEN | OPEN | OPEN | CLOSED |
| SWITCH 44 | 1st POS. | 1st POS. | 2nd POS. | 2nd POS. |
| LIGHT 45 | OFF | ON | ON | ON |
| LIGHT 46 | OFF | OFF | ON | ON |
| SWITCH 47 | OPEN | CLOSED | CLOSED | CLOSED |
| SWITCH 48 | CLOSED | CLOSED | OPEN | CLOSED |
| SWITCH 49 | CLOSED | CLOSED | OPEN | CLOSED |

The size of the float chamber 30, required for a particular engine application, will largely depend on the size of such engine. For example, the capacity of the float chamber could approximate one pint for standard automobiles and small trucks whereas such capacity could be increased to approximately one gallon for large trucks, earth-moving equipment and the like. The shape (e.g., cylindrical, box-like, etc.) and construction (e.g., arrangement of fuel inlets and outlets, passages, etc.) of air-purging device can also be varied, as will be appreciated by those skilled in the art.

The specific gravity of ball float 38 may be selected from the range of from 0.50 to 0.95 and preferably from the range of 0.50 to 0.70. The latter, preferred range will insure floating of the ball in diesel fuels having specific gravities less than 0.95. For example, the specific gravities for diesel fuels sold in the State of California, Mexico and the mid-continent are approximately 0.954, 0.987 and 0.812, respectively.

I claim:

1. An air-purging system for the fuel system of an internal combustion engine having a fuel tank adapted to contain liquid fuel therein, a main fuel pump and fuel distributing means for communicating said fuel to combustion chambers of said engine, said air-purging system comprising a housing defining a float chamber, an air outlet mean for communicating said float chamber with a vent line connectable to said fuel tank, fuel inlet means for communicating fuel from said fuel tank to said float chamber, and fuel outlet means for communicating fuel from said float chamber to said fuel distributing means, and float means having a specific gravity less than said fuel and disposed in said float chamber for movement between a first position closing said air outlet, in response to said float chamber being at least substantially filled with said fuel, a second position opening both said air outlet and said fuel outlet in response to said float chamber being only partially filled with said fuel, and a third position closing said fuel outlet in response to said float chamber being empty of said fuel.

2. The air-purging system of claim 1 further comprising orifice means for communicating a predetermined low volume of fuel flow from said float chamber to said fuel distributing means when said float means is in its third position.

3. The air-purging system of claim 2 wherein said orifice means is sized to have a cross-sectional area selected from the approximate range of from 0.004 in.$^2$ to 0.015 in.$^2$.

4. The air-purging system of claim 1 wherein vertically spaced upper and lower seats for said float means are defined in said housing and wherein said air outlet and said fuel outlet are defined in said upper and lower seats, respectively and are aligned vertically.

5. The air-purging system of claim 4 wherein said float means constitutes a spherical ball having a diameter selected from the approximate range of from 1.5 in. to 3.5 in. and said upper and lower seats are each semispherically shaped.

6. The air-purging system of claim 5 wherein said ball has a specific gravity selected from the approximate range of from 0.05 to 0.95.

7. The air-purging system of claim 5 wherein said ball is composed of an elastomeric material having a durometer hardness selected from the approximate range of from 20 to 60.

8. The air-purging system of claim 1 further comprising a separator and filter assembly attached to a lower end of said housing and connected between said fuel inlet means and said float chamber.

9. The air-purging system of claim 1 further comprising emergency shut-down means for automatically alerting an operator of said engine when said float means is in its second position and for supplying a sufficient amount of fuel to said fuel distributing means to temporarily maintain running of said engine.

10. An air-purging device for a diesel engine having a tank adapted to contain liquid diesel fuel therein, a transfer pump, a vent line connected to said tank, an injection pump, and an injector, said air-purging device comprising a housing disposed on a vertical axis thereof and defining a float chamber, fuel inlet means adapted for supplying said float chamber with fuel, fuel outlet means adapted for communicating fuel from said float chamber to said injection pump, air outlet means adapted for communicating said float chamber with said vent line, and spherically-shaped float mean shaving a specific gravity less than said fuel and freely suspended in unattached relationship in said float chamber for movement between a first position, a closing relationship on said air outlet means when said float chamber is at least substantially full of fuel, a second position opening both said air outlet mean sand said fuel outlet means when said float chamber is partially filled with fuel, and a third position on said fuel outlet means when said float chamber is empty of fuel.

11. The air-purging device of claim 10 further comprising orifice means adapted for continuously communicating a predetermined low volume of fuel flow, bypassing said fuel outlet means, from said float chamber to said injection pump.

12. The device of claim 11 wherein said orifice means has a cross-sectional area selected from the approximate range of from 0.004 in.$^2$ to 0.015 in.$^2$.

13. The air-purging device of claim 10 wherein said air outlet means and said fuel outlet means are aligned vertically on said axis.

14. The air-purging device of claim 10 wherein said float means constitutes a spherical ball having a diameter selected from the approximate range of from 1.5 in. to 3.5 in. and a specific gravity selected form the approximate range of from 0.50 to 0.95.

15. The device of claim 14 wherein said ball is composed of an elastomer having a durometer hardness selected from the approximate range of from 20 to 60.

16. An emergency shut-down system for the fuel system of an internal combustion engine having a fuel tank adapted to contain a liquid fuel therein, a main fuel pump connected to said fuel tank by a fuel line, and fuel distributing means for normally communicating said fuel to combustion chambers of said engine, said emergency shut-down system comprising monitor and control means for automatically (1) alerting an operator that the fuel in said fuel tank has fallen below a predetermined level, (2) providing said fuel distributing means and said combustion chambers with sufficient fuel to run said engine for a limited period of time, and (3) deactivating said fuel distributing means to stop communication of fuel to said combustion chambers after said fuel has been expended, said monitor and control means including normally open pressure-responsive first switch means closeable in response to the pressure in said fuel line falling below a predetermined level, operator-visible first indicator means for alerting said operator that the pressure of said fuel has fallen below said predetermined level in response to closing of said first switch means, and a normally inactive auxiliary pump means for being activated to pump fuel through said fuel line in response to closing of said first switch means.

17. The system of claim 16 further comprising normally-off operator-visible second indicator means for being activated to alert said operator in response to the absence of fuel pressure in said fuel line and a second pressure-responsive switch means trippable from a first position for activating said auxiliary pump means in response to closing of said first switch means to a second position for activating said second indicator means in response to an absence of fluid pressure in said auxiliary pump means.

18. The system of claim 17 further comprising normally closed switch means for opening to deactivate said fuel distributing means in response to an absence of fuel pressure at an upstream side of said fuel distributing means.

19. The system of claim 16 further comprising restart means for selectively activating said fuel distributing means.

* * * * *